United States Patent Office 3,505,070
Patented Apr. 7, 1970

3,505,070
DIRECT POSITIVE EMULSION CONTAINING DIMETHINE DYES CONTAINING A 2-AROMATICALLY SUBSTITUTED INDOLE NUCLEUS
Roberta A. Litzerman, Donald W. Hesteltine, and John D. Mee, Rochester, N.Y., assignors to Eastman Kodak Company, Rochester, N.Y., a corporation of New Jersey
No Drawing. Continuation-in-part of application Ser. No. 533,459, Mar. 11, 1966. This application Jan. 17, 1967, Ser. No. 609,764
Int. Cl. G03c 1/08
U.S. Cl. 96—102                23 Claims

ABSTRACT OF THE DISCLOSURE

Dimethine dyes are provided which contain a 2-aromatically substituted indole nucleus and a second desensitizing nucleus. Direct positive emulsions containing these dyes are also provided.

---

This application is a continuation-in-part of our U.S. patent application 533,459, filed Mar. 11, 1966, now abandoned.

This invention relates to photographic materials, and more particularly to novel dimethine cyanine dyes. It also relates to emulsions containing certain dimethine cyanine dyes.

Dimethine cyanine dyes containing a 2-phenyl substituted indole nucleus have been proposed as sensitizers for direct positive, fogged silver halide emulsions. This class of dyes is especially useful since clear white image areas may be obtained with direct positive emulsions sensitized with these dyes. The use of other dyes results in undesirable fog in the areas of the image which should appear white. However, direct positive emulsions containing any of the specific 2-phenyl indole dimethine cyanine dyes which are known, have low speeds. There is a need, therefore, to provide a class of dyes which provides good sensitivity together with good speed in direct positive photographic emulsions.

One object of this invention is to provide novel dimethine sensitizing dyes. Another object of this invention is to provide novel dimethine dyes which spectrally sensitize direct positive photographic emulsions. A further object of this invention is to provide novel dimethine dyes which provide good speed when incorporated in direct positive photographic emulsions. Still another object of this invention is to provide novel direct positive emulsions featuring novel dimethine dyes which spectrally sensitize the emulsion and provide good photographic speed. Another object of this invention is to provide novel dimethine dyes which may be used in emulsions containing photographic color formers. Other objects of the invention will be apparent from this disclosure and the appended claims.

In accordance with this invention, novel dimethine cyanine dyes are provided which have a 2-aromatically substituted indole nucleus attached to the methine chain by the 3-carbon atom of the indole nucleus. The second nucleus of these dimethine cyanine dyes is a desensitizing nucleus. As used herein and in the appended claims, "desensitizing nucleus" refers to those nuclei which, when converted to a symmetrical carbocyanine dye and added to a gelatin silver chlorobromide emulsion containing 40 mole percent chloride and 60 mole percent bromide, at a concentration of from 0.01 to 0.2 gram dye per mole of silver, cause, by electron trapping, at least an 80% loss in the blue speed of the emulsion when it is sensitometrically exposed and developed 3 minutes at 20° C. in Kodak developer D-19. Preferably, the desensitizing nuclei are those which, when converted to a symmetrical carbocyanine dye and tested as just described, essentially completely desensitize the test emulsion to blue radiation. Substantially complete desensitization as used herein refers to nuclei which, when tested as described above, result in at least about a 90%, and preferably more than a 95%, loss of speed to blue radiation.

An especially useful class of dimethine dyes of this invention has the following general formula:

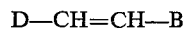

wherein D represents a 2-aromatically substituted indole nucleus attached to the methine chain through the 3-carbon atom of the indole nucleus; and B represents an organic desensitizing nucleus. A preferred desensitizing nucleus is an imidazo[4,5-b]quinoxaline nucleus attached, through the 2-carbon atom thereof, to the methine chain. Other highly useful nuclei include pyridyl, or nitro substituted heterocyclic nuclei (such as a thiazole nucleus, an oxazole nucleus, a selenazole nucleus or an indole nucleus), and the like.

A preferred group of the novel dyes of this invention is represented by the following general formula:

Formula I

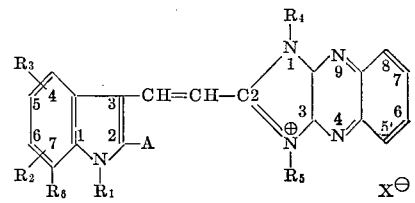

wherein A represents an aryl nucleus, such as a phenyl or naphthyl nucleus (which may contain various substituents, such as alkyl of 1 to 8 carbon atoms, e.g., methyl, ethyl, propyl, butyl, etc., alkoxy groups of about 1 to 8 carbon atoms, e.g., methoxy, ethoxy, propoxy, butyoxy, etc., halogen atoms such as bromine, chlorine or iodine, or aryl groups such as phenyl), or A may represent a heterocyclic nucleus, preferably containing from 5 to 6 atoms, and the hetero atom is preferably nitrogen, sulfur or oxygen; $R_2$ and $R_3$ each represents a hydrogen atom, a halogen atom, e.g., chlorine, or bromine, an alkyl or alkoxy substituent, preferably containing 1 to 8 carbon atoms, such as methyl, ethyl, propyl, butyl, methoxy, propoxy, hydroxy ethyl, etc., or, $R_2$ and $R_3$, taken together, represent the atoms necessary to complete a fused aromatic ring having 6 carbon atoms; $R_1$ represents an alcohol radical, e.g., an alkyl substituent (including substituted alkyl) and preferably containing from about 1 to 8 carbon atoms, such as methyl, ethyl, propyl, butyl, octyl, sulfoalkyl such as sulfopropyl or sulfobutyl, sulfatoalkyl such as sulfatopropyl or sulfatobutyl, or carboxyalkyl such as carboxyethyl or carboxybutyl; $R_4$ and $R_5$ each represents an alcohol radical e.g., an alkyl substituent (including substituted alkyl) preferably containing from 1 to 18 carbon atoms, such as methyl, ethyl, propyl, isopropyl, butyl, sec-butyl, hexyl, dodecyl, octadecyl, benzyl, beta-phenylethyl, sulfoalkyl such as sulfopropyl or sulfobutyl; sulfatoalkyl such as sulfatopropyl and sulfatobutyl; carboxyalkyl such as carboxyethyl and carboxybutyl; hydroxyalkyl such as hydroxyethyl, hydroxypropyl and hydroxybutyl; allyl; alkenyl such as propenyl and butenyl; alkynyl such as propargyl; cycloalkyl such as cyclobutyl and cyclohexyl; dialkylaminoalkyl, such as dimethylaminoethyl; and, aryl such as phenyl, p-tolyl, o-tolyl, 3,4-dichlorophenyl, etc.; $R_6$ has the same meaning as $R_2$ or, taken together with $R_1$, represents an alkylene group which may be substituted, e.g., with alkyl, cycloalkyl, halogen (Br or Cl), or cyano, the alkylene group preferably containing 2 to 3 carbon atoms, such as dimethylene or trimethylene; and X represents an anion, preferably an anion such as chloride, bromide, iodide, p-toluenesulfonate, thiocyanate, sulfamate, methyl sulfate, ethyl sulfate, perchlorate, etc.

When it is desired to employ an emulsion containing photographic color formers, it has been found especially advantageous to use dyes of the above formula wherein (1) $R_2$ and $R_3$, taken together, or $R_2$ and $R_6$, taken together, represent a fused ring, e.g., to form a benz[g]indole nucleus, or (2) A represents a pyridyl nucleus, e.g., a 2-, 3- or 4-pyridyl nucleus.

This invention will be further illustrated by the following examples. Examples 1–6 and 12–17 show the slow speeds obtained using prior art indole dimethine cyanine dyes which do not have a desensitizing nucleus. Examples 7–11 and 18–22 demonstrate the unexpected speed gain obtained when the 2-aromatically substituted indole dimethine cyanine dyes of the invention are used in the same emulsions.

EXAMPLES 1–22

A reduction-gold fogged emulsion is prepared as follows: A gelatin silver bromoiodide emulsion in which the halide is 2.5 mole percent iodide, and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C. over a period of about 35 minutes. The emulsion is chill-set, shredded and washed by leaching with cold water in the conventional manner. The emulsion is reduction-gold fogged by first adding 0.4 mg. of thiourea dioxide per mole of silver and heating for 60 minutes at 65° C. and then adding 2.0 mg. of potassium chloroaurate per mole of silver and heating for 60 minutes at 65° C. The fogged emulsion is divided into several portions and 0.87 millimole per mole of silver halide of each of the dyes listed in the following table is added to a portion of the emulsions. Each portion is coated on a cellulose acetate support at a laydown of 100 mg. of silver and 400 mg. of gelatin per square foot. A reduction fogged emulsion is prepared in a similar manner, except that no gold salt is used. The emulsion is reduction fogged by adding 40 mg. of thiourea dioxide per mole of silver halide to the emulsion and heating for 60 minutes at 65° C. The fogged emulsions are divided into several portions and 0.87 millimole per mole of silver halide of each of the dyes listed in the following table is added to a portion of each emulsion. Each emulsion is coated on a cellulose acetate support at a laydown of 100 mg. of silver and 400 mg. of gelatin per square foot. A sample of each coating is exposed on an Eastman Ib sensitometer using a tungsten source. The emulsions are given an unfiltered exposure and a blue exposure through Wratten 35+38A filters and a minus blue exposure through a Wratten 16 filter. The exposed coatings are processed for 6 minutes in a Kodak D–19 developer, fixed, washed and dried with the following results.

TABLE I

| | | | Reduction-Gold Fogged | | | Reduction Fogged | |
|---|---|---|---|---|---|---|---|
| Dye | Example | $\lambda_{max.}$ | Relative Blue Speed (B) | Relative Minus Blue Speed (MB) | MB/B Ratio | Example | Relative White Light Speed |
| I | 1 | 490 | 54 | 22 | .41 | 12 | 1.15 |
| II | 2 | 440 | 33 | 16 | .485 | 13 | 2.2 |
| III | 3 | 530 | 126 | 360 | 2.86 | 14 | 6.8 |
| IV | 4 | 535 | 145 | 570 | 3.93 | 15 | 2.6 |
| V | 5 | 550 | 132 | 460 | 3.49 | 16 | 2.0 |
| VI | 6 | 440 | 63 | 78 | 1.24 | 17 | 0.5 |
| VII | 7 | 550 | 210 | 2,760 | 13.1 | 18 | 21.0 |
| IX | 8 | 530 | 225 | 890 | 3.96 | 19 | 15.0 |
| X | 9 | 560 | 185 | 2,570 | 13.9 | 20 | 19.0 |
| XI | 10 | 575 | 210 | 3,020 | 14.4 | 21 | 17.0 |
| XII | 11 | 570 | 205 | 3,630 | 17.7 | 22 | 30.0 |

The data in the above table establishes the unexpectedly great gain in speed of the novel dimethine cyanine dyes of the invention (Examples 7–11 and 18–22) over that of the prior art dyes (Examples 1–6 and 12–17).

As noted above, desensitizing nuclei are those which, when converted to a symmetrical carbocyanine dye, cause at least an 80% loss in the relative blue speed of a test emulsion. Examples 23–32 illustrate the results of tests made with various nuclei which have been converted to symmetrical carbocyanine dyes and added to a test emulsion.

EXAMPLES 23–32

The dyes listed in the following table are added to separate portions of a gelatin silver chlorobromide (40 mole percent chloride) negative emulsion at 0.13 gram dye per mole of silver halide. A sample of each portion is coated on a cellulose acetate support at a laydown of 432 mg. of silver and 750 mg. of gelatin per square foot. A sample of each coating is given a blue exposure through Wratten 35+38A filters on an Eastman Ib sensitometer and processed for 3 minutes in Kodak developer D–19, fixed, washed and dried with the following results. A tungsten source was used.

TABLE II

| Dye | Example | Relative Blue Speed | Percent Speed Loss |
|---|---|---|---|
| Unsensitized Control | 23 | 100 | |
| I-A | 24 | 55 | 45 |
| III-A | 25 | 39 | 61 |
| IV-A | 26 | 30 | 70 |
| VI-A | 27 | 29 | 71 |
| VII-A | 28 | <1.0 | 99 |
| IX-A | 29 | 3.0 | 97 |
| X-A | 30 | <1.0 | 99 |
| XI-A | 31 | <1.0 | 99 |
| XII-A | 32 | <1.0 | 99 |

Examples 24–27 show that nuclei previously employed in 2-aromatic substituted indole dimethine cyanine dyes result in only about 71% or less desensitization to blue radiation. However, the dyes in accordance with the invention, which feature a desensitizing nucleus, cause at least a 97% loss in relative blue speed, as shown in Examples 28–32.

Below is a description of the dyes employed in the above examples.

| Dye No. | Name |
|---|---|
| I | 3'-ethyl-1-methyl-2-phenyl-3-indolo-oxacarbocyanine perchlorate |
| II | 3'-ethyl-2-p-methoxy-phenyl-1-methyl-3-indoloxacarbocyanine iodide |
| III | 3'-ethyl-1-methyl-2-phenyl-3-indolothiacarbocyanine perchlorate |
| IV | 3'-ethyl-1-methyl-2-phenyl-3-indoloselenacarbocyanine iodide |
| V | 3'-ethyl-2-p-methoxy-phenyl-1-methyl-3-indoloselenacarbocyanine iodidee |
| VI | 1,3'-dimethyl-2-phenyl-4',5'-benzo-3-indolothiacarbocyanine-p-toluenesulfonate |
| VII | 1,3-diethyl-1'-methyl-2'-phenyl-imidazo[4,5-b]-quinoxalino-3'-indolocarbocyanine iodide |
| IX | 1,1',3',3'-tetramethyl-2-phenyl-3-indolopyrrolo-[2,3-b] pyridocarbocyanine iodide |
| X | 1,1',3,3-tetramethyl-5-nitro-2'-phenylindo-3'-indolocarbocyanine iodide |
| XI | 3'-ethyl-1-methyl-2-phenyl-6'-nitro-3-indolothiacarbocyanine iodide |
| XII | 5'-chloro-1,3-dimethyl-2-phenyl-6'-nitro-3-indolothiacarbocyanine p-toluenesulfonate |
| I-A | 3,3'-diethyloxacarbocyanine iodide |
| III-A | 3,3'-diethylthiacarbocyanine iodide |
| IV-A | 3,3'-diethylselenacarbocyanine iodide |
| VI-A | 3,3'-dimethyl-4,5;4',5'-dibenzothiacarbocyanine bromide |
| VII-A | 1,1',3,3'-tetraethylimidazo-[4,5-b]-quinoxalinocarbocyanine chloride |
| I-XA | 1,1',3,3,3',3'-hexamethylpyrrolo-[2,3-b]-pyridocarbocyanine perchlorate |
| X-A | 1,1',3,3,3',3'-hexamethyl-5,5'-dinitroindocarbocyanin-p-toluenesulfonate |
| XI-A | 3,3'-diethyl-6,6'-dinitrothiacarbocyanine chloride |
| XII-A | 5,5'-dichloro-3,3'-diethyl-6,6'-dinitrothiacarbocyanin-iodide |

Other dyes useful in this invention, and methods for preparing them, are illustrated below.

3' - ethyl - 1 - methyl - 6' - nitro - 2 - (3 - pyridyl) - 3-indolothiacarbocyanine p-toluenesulfonate hydro p-toluenesulfonate (Dye 1)

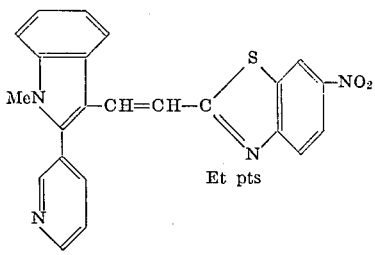

A mixture of 1-methyl-2-(3-pyridyl)indole-3-carboxaldehyde (1.12 g., 1 mol.), 3-ethyl-2-methyl-6-nitrobenzothiazolium p-toluenesulfonate (1.98 g., 1 mol.) and p-toluenesulfonic acid (0.95 g., 1 mol.) in acetic anhydride (10 ml.) was heated at reflux for 5 minutes, allowed to cool, and the product precipitated by the slow, stirred addition of excess ether. The solid was collected and dried. After two recrystallizations from ethanol, the yield of purified dye was 2.45 g. (63%), M.P. indistinct.

1,3 - diethyl - 1' - methyl - 2' - (3 - pyridyl) - imidazo[4,5-b] - quinoxalino - 3' - indolocarbocyanine iodide hydroiodide (Dye 2)

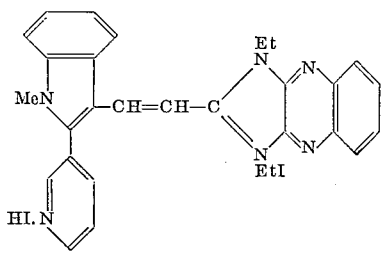

A mixture of 1-methyl-2-(3-pyridyl)indole-3-carboxaldehyde (1.12 g., 1 mol.) and 1,3-diethyl-2-methylimidazo[4,5-b]quinoxalinium chloride (1.39 g., 1 mol.) in acetic anhydride (10 ml.) was refluxed for 5 minutes, cooled, and conc. HCl (1 ml.) added. The mixture was cooled and the product precipitated as an oil by addition of excess ether. The ether was decanted, the residue dissolved in hot 50% ethanol (50 ml.) and KI (2 g.) added. The dye which separated on cooling was collected. After one recrystallization from methanol, the yield of purified dye was 0.32 g. (9%), M.P. 223° C. dec.

1-methyl-2-(3-pyridyl)indole-3-carboxaldehyde

Dimethylformamide (4 ml.) was placed in a flask and chilled in an ice-bath as POCl₃ (2 ml.) was added dropwise, then 1-methyl-2-(3-pyridyl) indole in warm dimethylformamide (10 ml.) was added in small portions, the temperature during both additions being kept below 20° C. The mixture was warmed at 38–40° C. for 45 minutes, then poured in 150 ml. ice water. 5 N-NaOH (27 mol.) was added, the mixture heated to boiling, then chilled. The solid was collected, washed with water, and dried. The yield of almost colorless crystals was 4.28 g. (94%), M.P. 146° C. This material was used for the preparation of dyes without further purification.

1-methyl-2-(3-pyridyl) indole 3-acetylpyridine (24.2 g., 1 mol.), 1-methyl-1-phenylhydrazine (24.4 g., 1 mol.) and glacial acetic acid (2.0 ml.) were heated together on a steam bath for 30 minutes as water separated. The mixture was cooled and diluted with ether. The ether layer was separated, dried over MgSO₄, and the ether evaporated.

100% phosphoric acid (50 g.) was heated to 100° C. and stirred as the crude hydrazone was added in small portions, at such a rate that the temperature stayed between 125–135° C. When the addition was complete, the mixture was heated in an oil bath at 140° C. for 30 minutes. The mixture was allowed to cool, diluted with water (500 ml.) and made basic by the addition of concentrated aqueous KOH solution. The oil which separated was extracted with ether, the extract dried over MgSO₄, and the ether evaporated. The residue was dissolved in hot EtOH (20 ml.) and the solution chilled. The solid which separated was collected, pressed as dry as possible on a filter, and washed with a very small volume of cold ethanol. The yield of very pale yellow crystals was 19.9 g. (48%), M.P. 79–81° C. This material was used without further purification.

1,3'-dimethyl-6'-nitro-2-phenyl-3-benz[g]indolothiacarbocyanine p-toluenesulfonate (Dye 3)

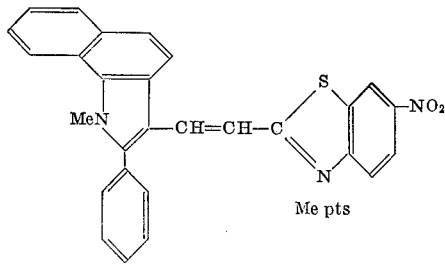

1 - methyl - 2 - phenylbenz[g]indole-3-carboxaldehyde (1.43 g., 1 mol.) and 2,3-dimethyl-6-nitrobenzothiazolium p-toluenesulfonate (1.90 g., 1 mol.) in acetic anhydride (20 ml.) were refluxed for 5 minutes with constant stirring. When cool, the mixture was diluted with ether and the solid collected and washed with ether. After two recrystallizations from methanol, the yield of purified dye was 1.22 g. (38%), M.P. 287–9° C. dec.

1',3'-diethyl-1-methyl-2-phenyl-3-benz[g]indoloimidazo[4,5-b]quinoxalinocarbocyanine iodide (Dye 4)

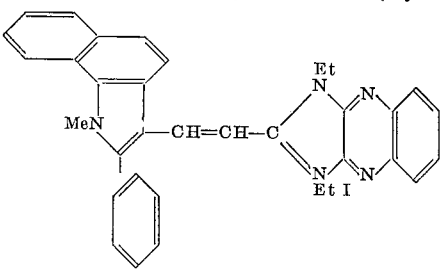

1 - methyl - 2 - phenylbenz[g]indole-3-carboxaldehyde (1.43 g., 1 mol.) and 1,3-diethyl-2-methylimidazo[4,5-b]quinoxalinium iodide (1.84 g., 1 mol.) in acetic anhydride (20 ml.) were refluxed for 5 minutes with constant stirring. The mixture was allowed to cool, diluted with ether, and the solid collected. After two recrystallizations from methanol, the yield of purified dye was 0.48 g. (15%), M.P. 293–4° C. dec.

1-methyl-2-phenylbenz[g]indole-3-carboxaldehyde

Dimethylformamide (6.0 ml.) was placed in a flask and chilled in an ice-bath. $POCl_3$ (3.0 ml.) was added dropwise, then 1-methyl-2-phenylbenz[g]indole (7.7 g.) in warm dimethylformamide (25. ml.) was added in small portions, the temperature being kept below 20° C. during both additions. The mixture was warmed at 35–40° C. for 45 minutes, then poured in ice-water (250 ml.). After brief stirring, a heavy precipitate separated. 5 N-NaOH (40 ml.) was added in portions, with stirring, and the mixture heated to boiling, then allowed to cool. The solid was collected and washed thoroughly with water. The yield of colorless crystals was 8.1 g. (95%), M.P. 170–171° C. This material was used for the preparation of dyes without further purification.

1-methyl-2-phenylbenz[g]indole 2-phenyl-1H-benz[g]indole (24.3 g., 1 mol.) which may be prepared according to Patel and Tedder, J.C.S. 1963, 4593–5, chlorobenzene (36 ml.) and water were slurried in a flask fitted with an efficient high-speed stirrer, a thermometer and an addition funnel. 50% NaOH (38 ml.) was added and the mixture stirred and heated to 63° C. The heating was stopped and the mixture stirred vigorously as methyl sulfate (15.1 g., 0.12 mol) was added slowly, at such a rate that the temperature stayed between 62–65° C. When the addition was complete, the mixture was stirred a further 30 minutes, then diluted to about 250 ml. with water. The chlorobenzene was removed by steam distillation, the residue chilled, and the solid collected and washed well with water and dried. The crude material was dissolved in benzene, chromatographed on an alumina column, and the benzene evaporated. The yield of white crystals was 11.1 g. (43%), M.P. 138.5–139.5° C.

Dyes 1–4 were added to a reduction-gold fogged emulsion prepared as in Example 1, the emulsions were exposed and developed 6 minutes in a Kodak D–19 developer, with the following results:

TABLE III

| Dye No. | Conc., g./mole | Density in Unexposed Areas | Minimum Density in Exposed Areas | Sens. max., mµ | Sens. Range, mµ |
|---|---|---|---|---|---|
| 1 | .258 | 1.84 | .07 | 560 | To 610. |
| 2 | .244 | 1.81 | .04 | 550 | To 600. |
| 3 | .243 | 1.99 | .08 | 565 | To 600. |
| 4 | .20 | 1.96 | .05 | 535 | To 590. |
| Control | | 2.05 | Increase in density with exposure | | |

The special dimethine cyanine dyes of this invention in which the indole nucleus is either (1) a benz[g]indole nucleus or (2) a pyridyl substituted indole nucleus, may be used in emulsions containing color couplers. This is quite unexpected since the known indole dimethine cyanine dyes cannot be successfully used in the presence of color couplers. Thus, Dye 4 was added to an emulsion prepared as disclosed in Example 1 with a color coupler, and compared with the related prior art dyes. Each sample was exposed and developed for six minutes in a metol-hydroquinone developer. The results are shown below:

TABLE IV

| Dye | Conc., g./mole | Dispersion | Density in Unexposed Areas | Minimum Density in Exposed Areas | Sens. max., mµ | Sens. Range, mµ |
|---|---|---|---|---|---|---|
| A | .187 | | 1.66 | .05 | 630 | To 685. |
| A | .187 | B | 1.66 | Increase in density with exposure | | |
| C | .675 | | 1.56 | .06 | 550 | To 605. |
| C | .675 | D | 1.57 | Increase in density with exposure | | |
| 4 | .735 | | 1.38 | .06 | 550 | To 610. |
| 4 | .735 | D | 1.52 | .38 | 535 | To 580. |

A—1,1' - dimethyl - 2,2'-diphenyl-3,3'-indolocarbocyanine bromide

B—A dispersion of a phenolic cyan coupler of the type described in U.S. Patent 2,474,293 in di-n-butyl phthalate C—1,3 - diethyl - 1'-methyl-2'-phenylimidazo[4,5-b]quinoxolino-3-indolocarbocyanine iodide D—A dispersion of a pyrazolone magenta coupler of the type described in U.S. Patent 2,600,788 in tri-o-cresyl phosphate Dyes 1 and 2 give results similar to Dye 4 in such emulsions containing photographic color formers.

3'-ethyl-6'-nitro-2-phenyl-1,7-trimethylene-3-indolothiacarbocyanine p-toluenesulfonate (Dye 5)

2 - phenyl - 1,7 - trimethyleneindole-3-carboxaldehyde (1.31 g., 1 mol.) and 3-ethyl-2-methyl-6-nitrobenzothiazolium p-toluenesulfonate (1.98 g., 1 mol.) in acetic anhydride (10 ml.) were heated at reflux for 5 minutes. The mixture was cooled, as some solid separated, and diluted with ether. The product was collected and washed with ether. After two recrystallizations from methanol, the yield of purified dye was 1.54 g. (48%), M.P. 254–5 degrees dec.

1,3-diethyl-2'-phenyl-1',7'-trimethyleneimidazo[4,5-b]quinoxalino-3'-indolocarbocyanine iodide (Dye 6)

2 - phenyl - 1,7 - trimethyleneindole-3-carboxaldehyde (1.31 g., 1 mol.) and 1,3-diethyl-2-methylimidazo[4,5-b]quinoxalinium iodide (1.84 g., 1 mol.) in acetic anhydride (10 ml.) were heated at reflux for 5 minutes. The mixture was cooled and diluted with ether. The solid was collected and washed with ether. After two recrystallizations from methanol, the yield of purified dye was 0.33 g. (11%), M.P. 230–1 degrees dec.

1',3',3'-trimethyl-2-phenyl-1,7-trimethylene-3-indolopyrrolo[2,3-b]pyridocarbocyanine iodide (Dye 7)

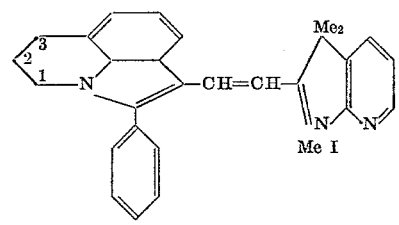

2-phenyl-1,7-trimethyleneindole-3-carboxaldehyde (0.8 g., 1 mol.), 1,3,3-trimethyl-2-methylene-2,3-dihydropyrrolo-[2,3-b]-pyridine (0.54 g., 1 mol.) and p-toluenesulfonic acid monohydrate (0.59 g., 1 mol.) in acetic anhydride (10 ml.) were heated at reflux for 1 minute. The mixture was cooled and diluted with ether, when the product separated as an oil. The ether layer was decanted, the oil dissolved in a small volume of ethanol, and sodium iodide (1.0 g.), dissolved in a little water, was added. The mixture was chilled and the solid collected and washed with ethanol. After one recrystallization from methanol, the yield of purified dye was 0.35 g. (21%), M.P. 283–4 degrees dec.

Dyes 5, 6 and 7 give results similar to Dyes 1–4 when incorporated in direct positive emulsions, which can contain color-former. Similar dyes may be prepared where a dimethylene bridge is formed rather than a trimethylene bridge. Referring to dyes such as Dye 7 above, when the trimethylene group is substituted, an alkyl group may be substituted on the 1, 2 or 3-carbon atom (counting from the N atom in the indole nucleus). Generally halogen or cyano groups are substituted on the 2-carbon atom.

Dye VII was prepared in the same manner as Dye 4 except the starting material used was, respectively, 1-methyl-2-phenylindole-3-carboxaldehyde, giving a yield of 29%, M.P. 248–249 degrees C. dec.

Dye XI was prepared in the same manner as Dye 3 above, except the starting materials were 1-methyl-2-phenyl-indole-3-carboxaldehyde and 3-ethyl-2-methyl-6-nitrobenzothiazolium p-toluene sulfonate giving a 12% yield, and an indistinct melting point. Dye X was prepared in the same manner as Dye XI except the starting material used was 1,2,3,3-tetramethyl-5-nitro(3H)indolium p-toluene sulfonate, giving a 22% yield, M.P. 252–256 degrees C., dec. Dye XII was prepared in the same manner as Dye XI except that the starting material used was 5-chloro-2,3-dimethyl-6-nitrobenzothiazolium p-toluene sulfonate.

Dye IX was prepared in the same manner as Dye 7, except that the starting material was 1-methyl-2-phenyl-indole-3-carboxaldehyde, giving a yield of 22%, M.P. 252–256 degrees C., dec.

Other dyes, used for test purposes herein, were prepared as follows:

Dye VII-A may be prepared as described in Belgian Patent 660,253, which also shows a method for preparing imidazo[4,5-b]quinoxalinium salts, which are useful in the preparation of various dyes employed herein.

Dye IX-A is prepared by refluxing, for 5 minutes, 1.74 g. 1,3,3-trimethyl-2-methylene-2,3-dihydropyrrolo[2,3-b]-pyridine; 2.45 g. diethoxymethyl acetate; 10 ml. pyridine and 0.95 g. p-toluenesulfonic acid·1 H$_2$O; cooling and precipitating the dye with acetone. The acetone is decanted, and the residue dissolved in ethyl alcohol, and 1 ml. 70% aqueous HClO$_4$ was added. The crude yield was 1.0 gram (44%). The dye, purified with methanol, had a M.P. of 256–257 degrees C., dec.

Dye X-A was prepared by mixing 3.9 grams 1,2,3,3-tetramethyl-5-nitro-(3H)-indolium p-toluenesulfonate and 1.6 g. diethoxymethylacetate in acetic anhydride, and refluxing for 3 minutes. The mixture was chilled and the dye crystallized from solution and collected on a Büchner funnel, washed with acetone and dried. Yield: 2.9 g. (94%); M.P. 297–298 degrees C., dec.

In accordance with the invention, novel and improved direct positive photographic silver halide emulsions are prepared by incorporating one or more of the cyanine dyes of the invention into a suitable fogged silver halide emulsion. The emulsion can be fogged in any suitable manner, such as by light or with chemical fogging agents, e.g., stannous chloride, formaldehyde, thiourea dioxide and the like. The emulsion may be fogged by the addition thereto of a reducing agent such as thiourea dioxide and a compound of a metal more electropositive than silver such as a gold salt, for example, potassium chloroaurate, as described in British Patent 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, (NH$_4$)$_2$PdCl$_6$ and the like.

Useful concentrations of reducing agent and metal compound (e.g., metal salt) can be varied over a considerable range. As a general guideline, good results are obtained using about .05 to 40 mg. reducing agent per mole of silver halide, and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68 degrees F. in developer Kodak DK–50 having the composition set forth below, when the emulsion is coated at a silver coverage of 50 mg. to 500 mg. per square foot.

DEVELOPER

|  | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |

Water to make 1.0 liter.

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, on the outer shell of such emulsions. These emulsions can be prepared in various ways, such as those described in Berriman U.S. patent application Ser. No. 448,467, filed Apr. 15, 1965. For example, the shell of the grains in such emulsions may be prepared by precipitating over the core grains a light-sensitive water-insoluble silver salt that can be fogged and which fog is removeable by bleaching. The shell is of sufficient thickness to prevent access of the developer used in processing the emulsions of the invention to the core. The silver salt shell is surface fogged to make developable to metallic silver with conventional surface image developing compositions. The silver salt of the shell is sufficiently fogged to produce a density of at least about 0.5 when developed for 6 minutes at 68 degrees F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

|  | G. |
|---|---|
| N-methyl-p-aminophenol sulfate | 2.5 |
| Ascorbic acid | 10.0 |
| Potassium metaborate | 35.0 |
| Potassium bromide | 1.0 |

Water to 1 liter.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubeneir in Science et Industries Photographiques, Vol. XXVIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons, as described and claimed in Illingsworth U.S. patent application Ser. No. 609,794, filed concurrently herewith and titled "Photographic Reversal Materials III," and corresponding Belgian Patent 695,366 of Sept. 11, 1967. The fogged silver halide grains of such emulsions are such that a test portion thereof, when coated as a photographic silver halide emulsion on a support to give a maximum density of at least about one upon processing for six minutes at about 68 degrees F. in Kodak DK-50 developer, has a maximum density which is at least about 30% greater than the maximum density of an identical coated test portion which is processed for six minutes at about 68 degrees F. in Kodak DK-50 developer after being bleached for about 10 minutes at about 68 degrees F. in a bleach composition of:

potassium cyanide—50 mg.
acetic acid (glacial)—3.47 cc.
sodium acetate—11.49 g.
potassium bromide—119 mg.
water to—1 liter The grains of such emulsions will lose at least about 25% and generally at least about 40% of their fog when bleached for ten minutes at 68 degrees F. in a potassium cyanide bleach composition as described herein. This fog loss can be illustrated by coating the silver halide grains as a photographic silver halide emulsion on a support to give a maximum density of at least 1.0 upon processing for six minutes at about 68 degrees F. in Kodak DK-50 developer and comparing the density of such a coating with an identical coating which is processed for six minutes at 68 degrees F. in Kodak DK-50 developer after being bleached for about 10 minutes at 68 degrees F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 609,778, filed concurrently herewith and titled "Direct Positive Photographic Emulsions I," and corresponding Belgian Patent 695,366 of Sept. 11, 1967. Such grains advantageously have a rather uniform diameter frequency distribution, as described and claimed in Illingsworth U.S. patent application Ser. No. 609,790, filed concurrently herewith and titled "Photographic Reversal Emulsions II," and corresponding Belgian Patent 695,366 of Sept. 11, 1967. For example, at least 95%, by weight of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pages 330–338. The fogged silver halide grains in these direct-positive photographic emulsions of this invention produce a density of at least 0.5 when developed without exposure for five minutes at 68 degrees F. in Kodak DK-50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to 500 milligrams of silver per square foot of support.

In the preparation of the above photographic emulsions, the dyes, of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromoiodide, etc. Particularly useful for direct positive fogged emulsions in which the silver salt is a silver bromohalide comprising more than 50 mole percent bromide. As indicated previously, certain dyes of this invention are also useful in emulsions which contain color formers. This is unexpected since related prior art dyes cannot be used in emulsions containing a color former.

The novel emulsions of this invention may be coated on any suitable photographic support, such as glass, film base such as cellulose acetate, cellulose acetate butyrate, polyesters such as polyethylene terephthalate, paper, baryta coated paper, polyolefin coated paper, e.g., polyethylene or polypropylene coated paper, which may be electron bombarded to promote emulsion adhesion, to produce the novel photographic elements of the invention.

As used herein, color formers include any of those compounds which react or "couple" with the oxidation product of primary aromatic amino developing agents on photographic development to form a dye, and are non-diffusible in photographic silver halide emulsions. Typical useful color formers include phenolic, 5-pyrazolone, heterocyclic, and open chain ketomethylene compounds, such as those described and referred to in U.S. Patents 2,322,027 and 2,801,171.

The dyes of this invention function as electron acceptors and spectrally sensitize (to radiation beyond about 480 m$\mu$) direct positive silver halide emulsions. The special spectral sensitivity provided with these emulsions is useful, particularly in multi-layer color photographic elements.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. In a fogged, direct positive silver halide emulsion containing a dimethine cyanine dye having a first nucleus and a second nucleus, said first nucleus being a 2-aromatically substituted indole nucleus attached by the 3-carbon atom thereof to the methine chain: the improvement wherein the second nucleus of said dye is a desensitizing nucleus, which densitizing nucleus, when converted to a symmetrical carbocyanine dye and added to a gelatin silver chlorobromide emulsion containing 40 mole percent chloride and 60 mole percent bromide, at a concentration of from .01 to .2 gram carbocyanine dye per mole of silver, causes, by electron trapping, at least about a 90 percent loss of speed of the silver chlorobromide emulsion when it is sensitometrically exposed and developed three minutes at 20° C. in Kodak developer D-19.

2. In a fogged, direct positive silver halide emulsion containing a dimethine cyanine dye having a first nucleus and a second nucleus, said first nucleus being a 2-aromatically substituted indole nucleus attached by the 3-carbon atom thereof to the methine chain: the improvement wherein said second nucleus is selected from the group consisting of an imidazo[4,5-b]quinoxaline nucleus attached by the 3-carbon atom thereof to the methine chain; a nitro substituted thiazole, oxazole, selenazole or indole nucleus; and, a pyrrolo[2,3-b]pyrido nucleus.

3. In a fogged, direct positive silver halide emulsion containing a dimethine cyanine dye having a first nucleus and a second nucleus, said first nucleus being a 2-aromatically substituted indole nucleus attached by the 3-carbon atom thereof to the methine chain: the improvement wherein said 2-aromatic substituent is a heterocyclic nucleus containing from 5 to 6 atoms wherein the hetero atom is selected from nitrogen, oxygen and sulfur; and, said second nucleus is a desensitizing nucleus, which desensitizing nucleus, when converted to symmetrical carbocyanine dye and added to a gelatin silver chlorobromide emulsion containing 40 mole percent chloride and 60 mole percent bromide, at a concentration of from .01 to .2 gram carbocyanine dye per mole of silver, causes, by electron trapping, at least about a 90 percent loss of speed of the silver chlorobromide emulsion when it is sensitometrically exposed and developed three minutes at 20 C. in Kodak developer D-19.

4. In a fogged, direct positive silver halide emulsion containing a dimethine cyanine dye having a first nucleus and a second nucleus, said first nucleus being a 2-aromatically substituted indole nucleus attached by the 3-carbon atom thereof to the methine chain: the improvement wherein said indole nucleus is a benz[g]indole nucleus; and, said second nucleus is a desensitizing nucleus, which desensitizing nucleus, when converted to symmetrical carbocyanine dye and added to a gelatin silver chlorobromide emulsion containing 40 mole percent chloride and 60 mole percent bromide, at a concentration of from 0.1 to .2 gram dye per mole of silver, causes, by electron trapping, at least about a 90 percent loss of speed of the silver chlorobromide emulsion when it is sensitometrically exposed and developed three minutes at 20° C. in Kodak developer D-19.

5. In a fogged, direct positive silver halide emulsion containing a dimethine cyanine dye having a first nucleus and a second nucleus, said first nucleus being a 2-aromatically substituted indole nucleus attached by the 3-carbon atom thereof to the methine chain: the improvement wherein said first nucleus is a 1,7-alkylene benzindole nucleus; and, said second nucleus is a desensitizing nucleus, which desensitizing nucleus, when converted to symmetrical carbocyanine dye and added to a gelatin silver chlorobromide emulsion containing 40 mole percent chloride and 60 mole percent bromide, at a concentration of from .01 to .2 gram dye per mole of silver, causes, by electron trapping, at least about a 90 percent loss of speed of the silver chlorobromide emulsion when it is sensitometrically exposed and developed three minutes at 20° C. in Kodak developer D-19.

6. A fogged, direct positive silver halide emulsion containing a dye having the following general formula:

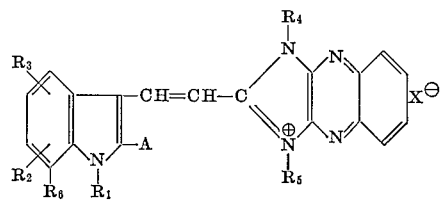

wherein A represents a substituent selected from the group consisting of an aryl nucleus and a heterocyclic nucleus containing 5 to 6 atoms, and the hetero atom is selected from the group consisting of nitrogen, sulfur and oxygen; $R_2$ and $R_3$ each represents a substituent selected from the group consisting of a hydrogen atom, an alkoxy group, an alkyl substituent, a halogen atom and, taken together, the atoms necessary to complete a fused aromatic ring having 6 carbon atoms; $R_1$ represents an alcohol radical ; $R_4$ and $R_5$ each represents a substituent selected from the group consisting of an alcohol radical and an aryl substituent; $R_6$ has a value selected from those given for $R_2$ and, taken together with $R_1$, an alkylene substituent; and, X represents an anion.

7. A fogged direct positive silver halide emulsion containing a dye having the following general formula:

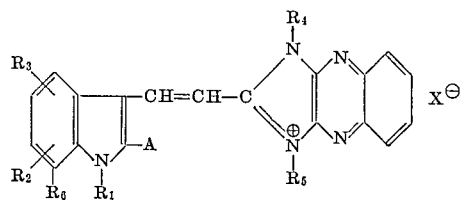

wherein A represents a substituent selected from the group consisting of an aryl nucleus and a heterocyclic nucleus containing from 5 to 6 atoms, and the hetero atom is selected from the group consisting of nitrogen, sulfur and oxygen; $R_2$ and $R_3$ are taken together and represent the atoms necessary to complete a fused aromatic having 6 carbon atoms; $R_1$ represents an alcohol radical; $R_4$ and $R_5$ each represents a substituent selected from the group consisting of an alcohol radical and an aryl substituent; $R_6$ has a value selected from hydrogen, the value given for $R_2$ and, taken together with $R_1$, an alkylene substituent; and, X represents an anion.

8. The direct positive emulsion of claim 6 wherein said emulsion contains a photographic color former.

9. A fogged direct positive silver halide emulsion containing a dye having the following general formula:

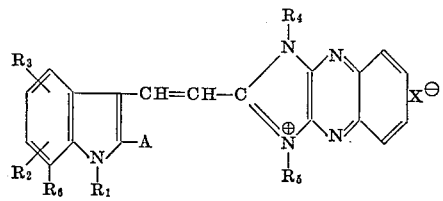

wherein A represents a heterocyclic nucleus containing 5 to 6 atoms, and the hetero atom is selected from the group consisting of nitrogen, sulfur and oxygen; $R_2$ and $R_3$ each represents a substituent selected from the group consisting of a hydrogen atom, an alkoxy group, an alkyl substituent, a halogen atom and, taken together, the atoms necessary to complete a fused aromatic ring having 6 carbon atoms; $R_1$ represents an alcohol radical; $R_4$ and $R_5$ each represents a substituent selected from the group consisting of an alcohol radical and an aryl substituent; $R_6$ has a value selected from those given for $R_2$ and, taken together with $R_1$, an alkylene substituent; and, X represents an anion.

10. The direct positive emulsion of claim 6 wherein said emulsion contains a photographic color former.

11. A fogged direct positive silver halide emulsion containing a dye having the following general formula:

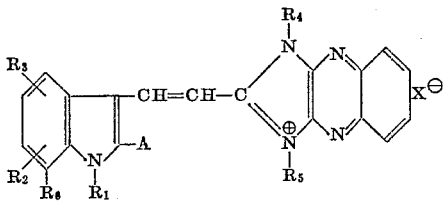

wherein A represents a substituent selected from the group consisting of an aryl nucleus and a heterocyclic nucleus containing 5 to 6 atoms, and the hetero atom is selected from the group consisting of nitrogen, sulfur and oxygen; $R_2$ and $R_3$ each represents a substituent selected from the group consisting of a hydrogen atom, an alkoxy group, an alkyl substituent, a halogen atom and, taken together, the atoms necessary to complete a fused aromatic ring having 6 carbon atoms; $R_1$ and $R_6$, together, represent the atoms to complete an alkylene substituent; and, X represents an anion.

12. The direct positive emulsion of claim 11 wherein said emulsion contains a photographic color former.

13. A direct positive, photographic emulsion in accordance with claim 1 which comprises fogged silver halide grains, said grains being such that a test portion thereof, when coated as a photographic silver halide emulsion on a support to give a maximum density of at least about 1 upon processing for 6 minutes at about 68 degrees F. in Kodak DK–50 developer, has a maximum density which is at least about 30% greater than the maximum density of an identical coated test portion which is processed for 6 minutes at about 68 degrees F. in Kodak DK–50 developer after being bleached for about 10 minutes at about 68 degrees F. in a bleach composition of:

potassium cyanide—50 mg.
acetic acid (glacial)—3.47 cc.
sodium acetate—11.49 g.
potassium bromide—119 mg.
water to—1 liter 14. A direct positive, photographic emulsion in accordance with claim 1 which comprises fogged silver halide grains, at least 95%, by weight, of said grains having a diameter which is within about 40% of the average grain size.

15. A direct positive, photographic emulsion in accordance with claim 7 which comprises fogged silver halide grains, said grains being such that a test portion thereof, when coated as a photographic silver halide emulsion on a support to give a maximum density of at least about 1 upon processing for 6 minutes at about 68 degrees F. in Kodak DK–50 developer, has a maximum density which is at least about 30% greater than the maximum density of an identical coated test portion which is processed for 6 minutes at about 68 degrees F. in Kodak DK–50 developer after being bleached for about 10 minutes at about 68 degrees F. in a bleach composition of:

potassium cyanide—50 mg.
acetic acid (glacial)—3.47 cc.
sodium acetate—11.49 g.
potassium bromide—119 mg.
water to—1 liter 16. A direct positive, photographic emulsion in accordance with claim 6 which comprises fogged silver halide grains, at least 95%, by weight, of said grains having a diameter which is within about 40% of the average grain size.

17. A fogged direct positive silver halide emulsion containing a dye selected from the group consisting of: 1,3-diethyl - 1'-methyl - 2'-phenyl-imidazo[4,5-b]quinoxalino-3'-indolocarbocyanine salt; 1,1',3',3'-tetramethyl-2-phenyl - 3-indolopyrrolo[2,3-b]pyridocarbocyanine salt; 1,1',3,3-tetramethyl - 5-nitro-2'-phenylindo - 3'-indolocarbocyanine salt; 3'-ethyl-1-methyl-2-phenyl-6'-nitro-3-indolothiacarbocyanine salt; 5'-chloro-1,3'-dimethyl-2-phenyl-6'-nitro-3-indolothiacarbocyanine salt; 3'-ethyl-1-methyl-6'-nitro-2-(3-pyridyl)-3-indolothiacarbocyanine salt; 1,3-diethyl-1'-methyl - 2'-(3-pyridyl)-imidazo[4,5-b]quinoxalino-3'-indolocarbocyanine salt; 1,3'-dimethyl-6'-nitro-2-phenyl-3-benz[g]indolothiacarbocyanine salt; 1',3'-diethyl - 1-methyl - 2-phenyl - 3-benz[g]indoloimidazo[4,5-b]quinoxalinocarbocyanine salt; 3'-ethyl - 6'-nitro - 2-phenyl-1,7-trimethylene - 3-indolothiacarbocyanine salt; 1,3-diethyl - 2'-phenyl - 1',7'-trimethyleneimidazo[4,5-b]quinoxalino-3'-indolocarbocyanine salt; and 1',3',3'-trimethyl-2-phenyl - 1,7-trimethylene - 3-indolopyrrolo[2,3-b]pyridocarbocyanine salt.

18. A fogged direct positive silver halide emulsion containing 1,3-diethyl - 1'-methyl - 2'-phenyl-imidazo[4,5-b]quinoxalino-3'-indolocarbocyanine salt.

19. A fogged direct positive silver halide emulsion containing 1,1',3',3'-tetramethyl - 2-phenyl - 3-indolopyrrolo[2,3-b]pyridocarbocyanine salt.

20. A fogged direct positive silver halide emulsion containing 1,1',3,3-tetramethyl - 5-nitro - 2'-phenylindo - 3'-indolocarbocyanine salt.

21. A fogged direct positive silver halide emulsion containing 3'-ethyl - 1-methyl - 2-phenyl - 6'-nitro-3-indolothiacarbocyanine salt.

22. A fogged direct positive silver halide emulsion containing 5'-chloro - 1,3'-dimethyl - 2-phenyl - 6'-nitro-3-indolothiacarbocyanine salt.

23. A fogged direct positive silver halide emulsion containing 1,3-diethyl - 2'-phenyl - 1',7'-trimethyleneimidazo[4,5-b]quinoxalino-3'-indolocarbocyanine salt.

References Cited

UNITED STATES PATENTS 3,140,951  7/1964  Heseltine et al. _____ 96—101
3,314,796  4/1967  Gotze et al. _____ 96—64 X NORMAN G. TORCHIN, Primary Examiner R. E. FICHTER, Assistant Examiner U.S. Cl. X.R.

96—101, 107; 260—240.6